United States Patent
Kondo et al.

(10) Patent No.: US 8,059,162 B2
(45) Date of Patent: Nov. 15, 2011

(54) IMAGING APPARATUS AND METHOD, AND METHOD FOR DESIGNING IMAGING APPARATUS

(75) Inventors: Tetsujiro Kondo, Tokyo (JP); Tetsushi Kokubo, Kanagawa (JP); Kenji Tanaka, Tokyo (JP); Hitoshi Mukai, Kanagawa (JP); Kazumasa Tanaka, Chiba (JP); Hirofumi Hibi, Tokyo (JP)

(73) Assignee: Sony Corporation, Tokyo (JP)

( * ) Notice: Subject to any disclaimer, the term of this patent is extended or adjusted under 35 U.S.C. 154(b) by 366 days.

(21) Appl. No.: 11/837,969

(22) Filed: Aug. 13, 2007

(65) Prior Publication Data

US 2008/0112635 A1 May 15, 2008

(30) Foreign Application Priority Data

Nov. 15, 2006 (JP) ................................. 2006-308680

(51) Int. Cl.
*G02B 27/10* (2006.01)
(52) U.S. Cl. ....................... 348/222.1; 359/618; 348/335
(58) Field of Classification Search .................. 348/262, 348/335, 236, 364, 135, 139; 359/639
See application file for complete search history.

(56) References Cited

U.S. PATENT DOCUMENTS

| | | | | |
|---|---|---|---|---|
| 4,281,339 A * | 7/1981 | Morishita et al. | ............. | 348/236 |
| 5,414,465 A * | 5/1995 | Kodama et al. | ............... | 348/236 |
| 5,694,165 A * | 12/1997 | Yamazaki et al. | ......... | 348/218.1 |
| 6,894,839 B2 * | 5/2005 | Sugiyama et al. | ............ | 359/618 |
| 7,158,656 B2 * | 1/2007 | Covell et al. | .................. | 382/106 |
| 7,443,590 B2 * | 10/2008 | Kondo et al. | .................. | 359/618 |
| 2002/0044202 A1 * | 4/2002 | Lee et al. | .......................... | 348/42 |
| 2002/0089698 A1 * | 7/2002 | Inoue et al. | ..................... | 358/302 |
| 2004/0080661 A1 * | 4/2004 | Afsenius et al. | ................. | 348/345 |
| 2004/0240052 A1 * | 12/2004 | Minefuji et al. | ............... | 359/435 |
| 2006/0215021 A1 * | 9/2006 | Suto et al. | ...................... | 348/139 |
| 2007/0127119 A1 | 6/2007 | Kondo et al. | | |
| 2009/0128643 A1 * | 5/2009 | Kondo et al. | ............... | 348/218.1 |

FOREIGN PATENT DOCUMENTS

| | | |
|---|---|---|
| JP | 2001-045508 | 2/2001 |
| JP | 2006-229908 | 8/2006 |
| WO | WO 2006077777 A1 * | 7/2006 |

OTHER PUBLICATIONS

"MEGA VISION The Ultra-Widescreen High-Definition Visual System", MEGA VISION Corporation, pp. 1-10, 2004, http://www.megavision.co.jp/mvpdf/img/megavision.pdf.

* cited by examiner

*Primary Examiner* — David Ometz
*Assistant Examiner* — Dwight C Tejano
(74) *Attorney, Agent, or Firm* — Oblon, Spivak, McClelland, Maier & Neustadt, L.L.P.

(57) ABSTRACT

A single-focus imaging apparatus having an array of imaging devices includes an optical system including a first imaging system that produces a focused image, at least one imaging plane on which an image produced through the first imaging system is formed, and a second imaging system group including an array of second imaging systems, each second imaging system including the imaging device and a lens through which at least part of the image formed on the imaging plane is formed on the imaging device. At least the position of the lens, the distance between the lens and the imaging device, and the angle of view are determined as parameters of each second imaging system in accordance with the position of the imaging plane that changes depending on the distance between the imaging apparatus and an object.

6 Claims, 9 Drawing Sheets

FIG. 8

| CONDITION | DETERMINATION (DISTANCE) |
|---|---|
| $V_{i,j}^{(0,\alpha)} > t1 \,\&\, V_{i,j}^{(\alpha,0)} < t2$ | A |
| $t2 \le V_{i,j}^{(0,\alpha)} \le t1 \,\&\, V_{i,j}^{(\alpha,0)} < t2$ | On |
| $V_{i,j}^{(0,\alpha)} < t2 \,\&\, V_{i,j}^{(\alpha,0)} < t2$ | B |
| $V_{i,j}^{(0,\alpha)} < t2 \,\&\, t2 \le V_{i,j}^{(\alpha,0)} \le t1$ | Of |
| $V_{i,j}^{(0,\alpha)} < t2 \,\&\, V_{i,j}^{(\alpha,0)} > t1$ | C |
| OTHERS | SUSPENSION OF DETERMINATION |

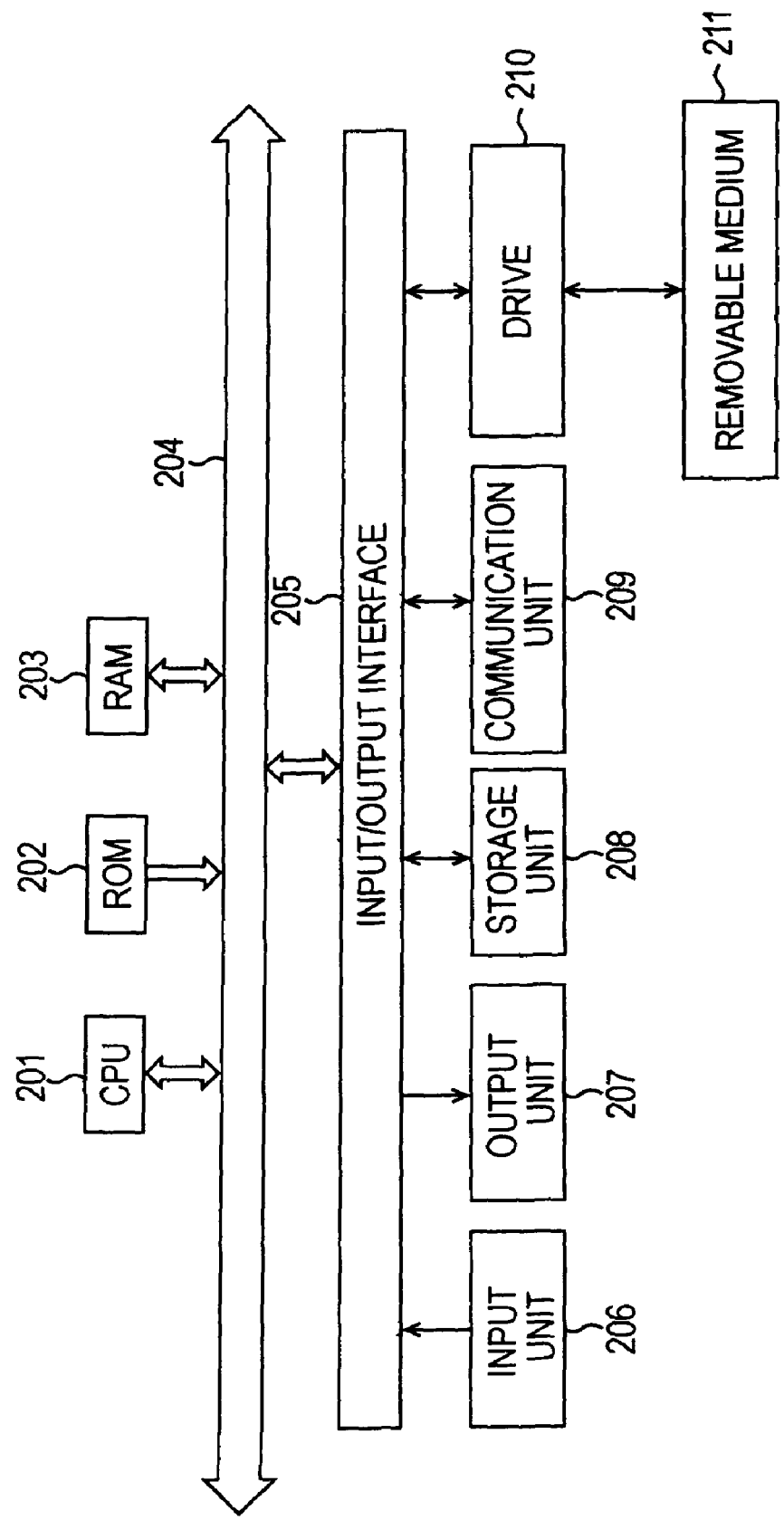

IMAGING APPARATUS AND METHOD, AND METHOD FOR DESIGNING IMAGING APPARATUS

BACKGROUND OF THE INVENTION

1. Field of the Invention

The present invention relates to an imaging apparatus and method and a method for designing the imaging apparatus, and in particular, relates to a high-resolution, high-definition, and single-focus imaging apparatus including a plurality of imaging devices, a method capable of imaging with the imaging apparatus in consideration of the distance between the imaging apparatus and an object, thus simultaneously and separately capturing a far-distance image and a near-distance image and measuring an object distance in the images, and a method for designing the imaging apparatus.

2. Description of the Related Art

Various high-resolution imaging methods have been proposed. The methods are classified broadly into two groups: increasing the resolution of an imaging device, such as a charge-coupled device (CCD), and arranging a plurality of imaging devices to capture an image at a high resolution.

The latter group, i.e., the methods for capturing an image at a high resolution using a plurality of imaging devices include the following known techniques: One technique is disclosed in Japanese Unexamined Patent Application Publication No. 2001-45508 (Patent Document 1). Another technique is disclosed in "Zaidan-hojin Kikai System Shinko-kyokai no Shusaisuru Megavision no Setsumei (Explanation of Megavision Sponsored by The Mechanical Social Systems Foundation)" (Non-patent Document 1), [online], [retrieved on 2005 Jan. 17], retrieved from the website of The Machine Industry Memorial Foundation using the Internet.

According to the technique disclosed in Patent Document 1, an image is captured using respective apertures of CCDs, i.e., by phase shift. This technique is very simple. Each color component of light is split into four beams by an associated prism and four CCDs receiving the split beams are shifted by half a pixel.

The other technique disclosed in Non-patent Document 1 supports a system for Megavision sponsored by The Machine Industry Memorial Foundation. According to this technique, an image is divided into three segments by a prism and the three segments are captured by three HD camcorders.

The above-described techniques have disadvantages in that a high-resolution, high-definition, and single-focus imaging apparatus is very difficult to manufacture at low cost.

The present inventors have invented a new technique capable of manufacturing a high-resolution, high-definition, and single-focus imaging apparatus including a plurality of imaging devices at low cost in consideration of the above-described circumstances and applied the invention as Japanese Patent Application No. 2005-063675.

The technique disclosed in Japanese Patent Application No. 2005-063675 can overcome the disadvantages of Patent Document 1 and Non-patent Document 1. Accordingly, it can be easily imagined that, for example, a demand to simultaneously and separately capture a far-distance image and a near-distance image using the technique disclosed in Japanese Patent Application No. 2005-063675 and a demand to measure an object distance in the images using this technique will be made.

SUMMARY OF THE INVENTION

It is, however, difficult to adequately satisfy those demands by simply using the technique disclosed in Japanese Patent Application No. 2005-063675. The descriptions of the specification and the drawings of Japanese Patent Application No. 2005-063675 are insufficient to discuss measurement of the distance between the imaging apparatus and an object.

The present invention is made in consideration of the above-described situations and it is desirable to enable imaging in consideration of the distance between an object and a high-resolution, high-definition, and single-focus imaging apparatus including a plurality of imaging devices, thus simultaneously and separately capturing a far-distance image and a near-distance image and measuring an object distance in the images.

According to an embodiment of the present invention, there is provided a single-focus imaging apparatus including an array of imaging devices, the apparatus including an optical system. The optical system includes a first imaging system that produces a focused image, at least one imaging plane on which an image produced through the first imaging system is formed, and a second imaging system group including an array of second imaging systems. Each second imaging system includes the imaging device and a lens through which at least part of the image formed on the imaging plane is formed on the imaging device. As parameters of each second imaging system, at least the position of the lens, the distance between the lens and the imaging device, and the angle of view are determined in accordance with the position of the imaging plane that changes depending on the distance between the imaging apparatus and an object.

The second imaging system group may include a first subgroup and a second subgroup. The first subgroup includes an array of second imaging systems each having first type parameters determined in accordance with the position of the imaging plane located when the distance between the imaging apparatus and the object is a first length. The second subgroup includes an array of second imaging systems each having second type parameters determined in accordance with the position of the imaging plane located when the distance between the imaging apparatus and the object is a second length shorter than the first length.

The imaging apparatus may further include a processor that joins images captured through the respective imaging devices of the second imaging systems having the first type parameters to form a first image and joins images captured through the respective imaging devices of the second imaging systems having the second type parameters to form a second image.

The processor may execute a process of measuring the distance between the imaging apparatus and a real-space domain using the first and second images, the real-space domain corresponding to a predetermined part of each of the first and second images.

According to another embodiment of the present invention, there is provided a method for imaging with an imaging apparatus that includes at least a first imaging system and a plurality of second imaging systems each including a lens and an imaging device. The method includes the steps of: forming a focused image on a predetermined imaging plane through the first imaging system, forming an image of predetermined part of the image, formed on the imaging plane, on the imaging device of each second imaging system, and capturing the predetermined part image formed on each imaging device therethrough. In this method, before capturing the predetermined part image, at least the position of the lens, the distance between the lens and the imaging device, and the angle of view are determined as parameters of each second imaging system in accordance with the position of the imaging plane that changes depending on the distance between the imaging apparatus and an object.

In the imaging apparatus and method according to the above-described embodiments of the present invention, the first imaging system forms a focused image on the imaging plane, the lens of each of the arrayed second imaging systems forms an image of predetermined part of the image, formed on the imaging plane, on the corresponding imaging device, and the imaging device captures the formed image. As parameters of each second imaging system, at least the position of the lens, the distance between the lens and the imaging device, and the angle of view are determined in accordance with the position of the imaging plane that changes depending on the distance between the imaging apparatus and an object.

According to further another embodiment of the present invention, there is provided a method for designing an imaging apparatus including at least a first imaging system and a plurality of second imaging systems each including a lens and an imaging device. In the method, at least the position of the lens, the distance between the lens and the imaging device, and the angle of view are determined as parameters of each second imaging system in accordance with the position of a predetermined imaging plane that changes depending on the distance between the imaging apparatus and an object so that a focused image is formed on the predetermined imaging plane through the first imaging system and an image of predetermined part of the image formed on the imaging plane is formed on the imaging device of each second imaging system.

In this method, the imaging apparatus is designed so that the first imaging system forms a focused image on the imaging plane, the lens of each of the arrayed second imaging systems forms an image of predetermined part of the image, formed on the imaging plane, on the corresponding imaging device, and the imaging device captures the formed image. As parameters of each second imaging system, at least the position of the lens, the distance between the lens and the imaging device, and the angle of view are determined in accordance with the position of the imaging plane that changes depending on the distance between the imaging apparatus and an object.

As described above, according to the present invention, a high-resolution, high-definition, and single-focus imaging apparatus can be realized at a low cost. Particularly, the imaging apparatus can capture images in consideration of the distance from an object. Thus, the imaging apparatus can simultaneously and separately capture a far-distance image and a near-distance image and measure an object distance in the images.

BRIEF DESCRIPTION OF THE DRAWINGS

FIG. 8 shows an example of a table listing conditions for measurement of the distance between the imaging apparatus and a real object using the far-distance image and the near-distance image in FIG. 6; and FIG. 9 is a diagram illustrating the structure of a personal computer that can execute a process according to an embodiment of the present invention.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 1:
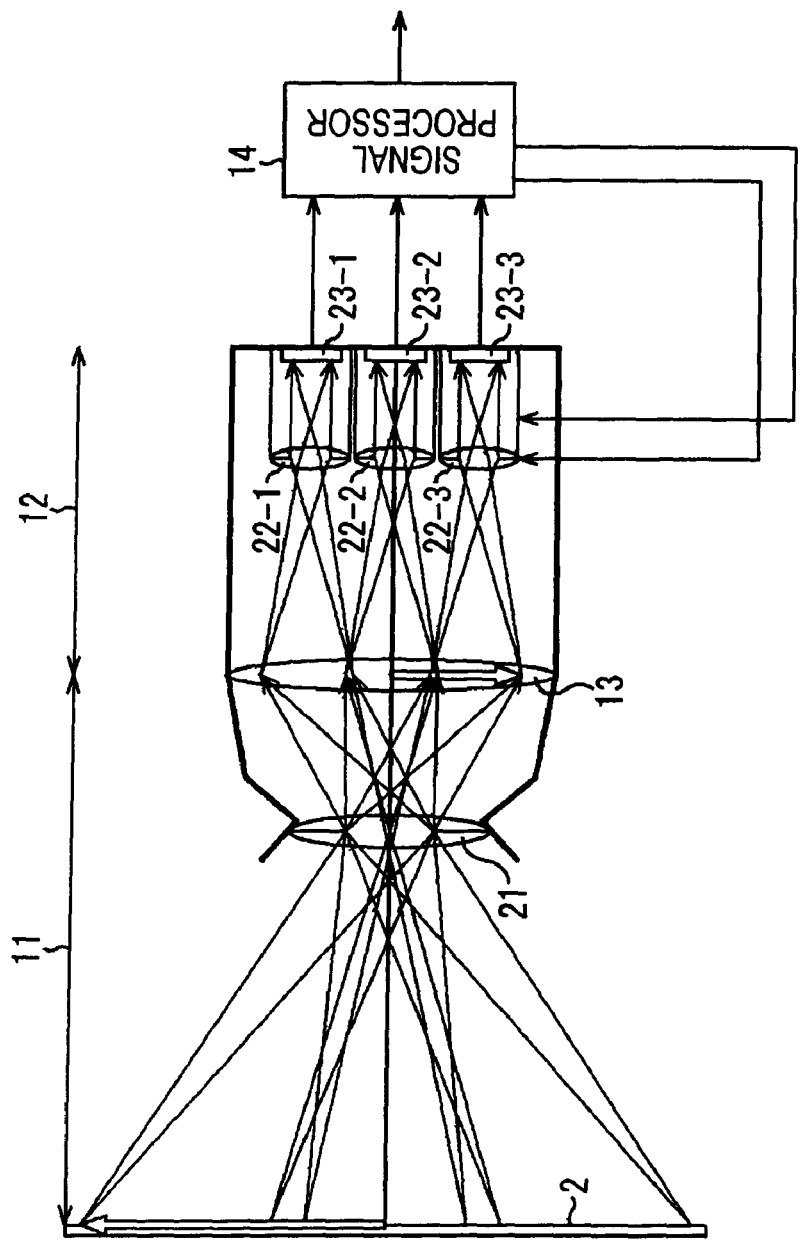
FIG. 1 is a diagram illustrating the structure of an imaging apparatus according to an embodiment of the present invention.

According to an embodiment of the present invention, there is provided a focusing imaging apparatus (e.g., an imaging apparatus in FIG. 1) including an array of imaging devices. The apparatus includes an optical system including a first imaging system (e.g., a first optical system 11 in FIG. 1) that produces a focused image, at least one imaging plane (e.g., a plane where a field lens 13 in FIG. 1 is disposed or a plane near the field lens 13, specifically, imaging planes 62-$f$ and 62-$n$ in FIG. 4 or 5) on which an image produced through the first imaging system is formed, and a second imaging system group (e.g., a second optical system group 12 in FIG. 1) including an array of second imaging systems. Each second imaging system includes the imaging device (e.g., a CCD 23-K in FIG. 1, K being a positive integer) and a lens (e.g., a zoom lens 22-K in FIG. 1) through which at least part of the image formed on the imaging plane is formed on the imaging device. As parameters of each second imaging system, at least the position of the lens (e.g., the position of a zoom lens 22-Kf represented by a distance Xf from the imaging plane 62-$f$ or the position of a zoom lens 22-Kn represented by a distance Xn from the imaging plane 62-$n$ in FIG. 4 or 5), the distance between the lens and the imaging device (e.g., a distance Xf' or Xn' in FIG. 4 or 5), and the angle of view (e.g., the angle of view represented by a size Cf of a CCD 23-Kf or the angle of view represented by a size Cn of a CCD 23-Kn in FIG. 4 or 5) are determined in accordance with the position of the imaging plane (e.g., the position of an imaging plane Df represented by a distance Sf' or the position of an imaging plane Dn represented by a distance Sn' in FIG. 4 or 5) that changes depending on the distance (e.g., a distance Sf or Sn in FIG. 4 or 5) between the imaging apparatus and an object.

The second imaging system group may include first and second subgroups. The first subgroup includes an array of second imaging systems (each including the zoom lens 22-Kf and the CCD 23-Kf) each having first type parameters (indicating, e.g., the distance Xf, the distance Xf', the size Cf in FIG. 4 or 5) determined in accordance with the position of the imaging plane (e.g., the position of the far-distance imaging plane 62-f in FIG. 4 or 5) located when the distance between the imaging apparatus and the object is a first length. The second subgroup includes an array of second imaging systems (each including the zoom lens 22-Kn and the CCD 23-Kn) each having second type parameters (indicating, e.g., the distance Xn, the distance Xn', and the size Cn in FIG. 4 or 5) determined in accordance with the position of the imaging plane (e.g., the position of the near-distance imaging plane 62-n in FIG. 4 or 5) located when the distance between the imaging apparatus and the object is a second length shorter than the first length.

Figure 6:
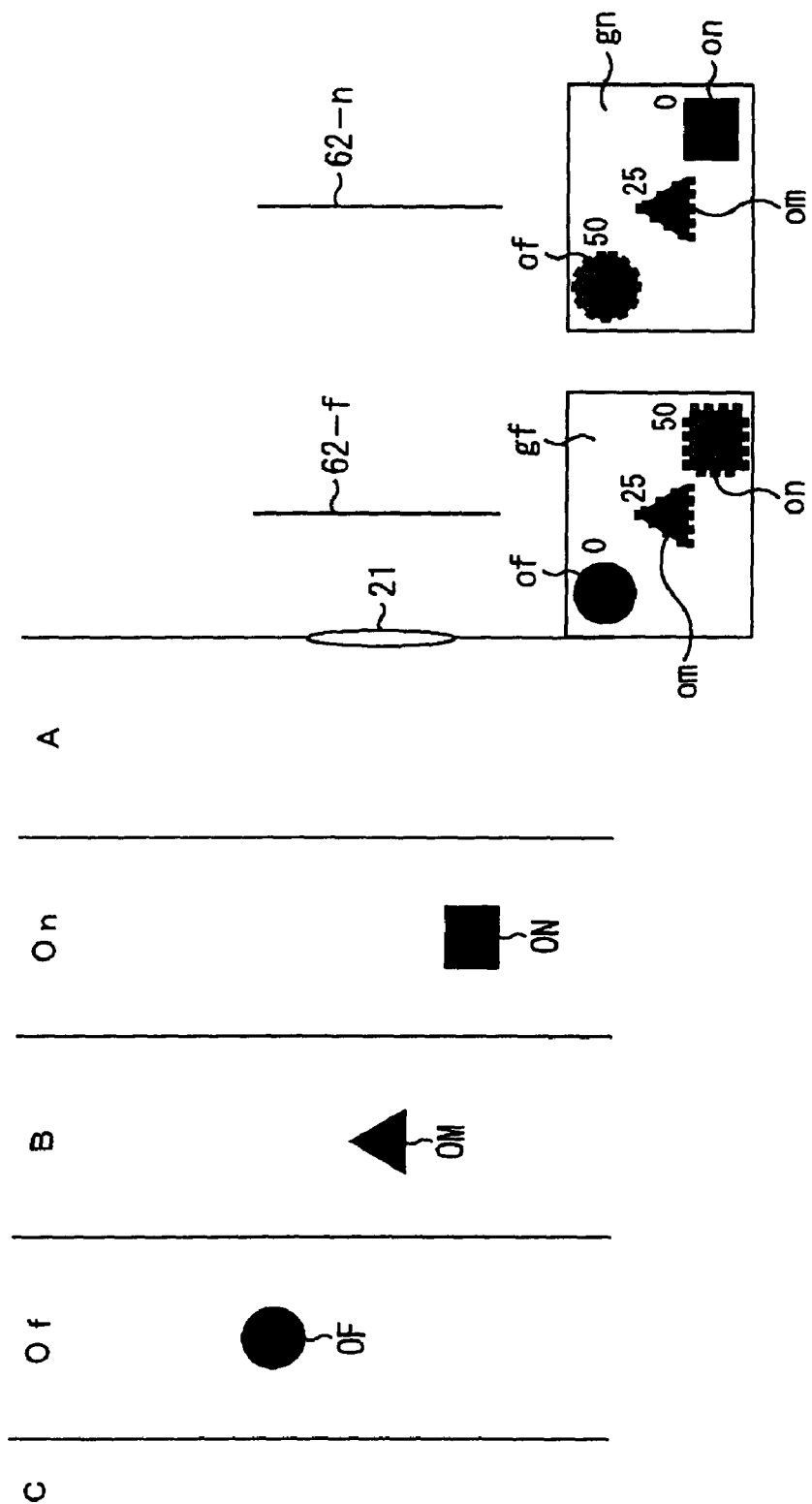
FIG. 6 is a diagram showing examples of a far-distance image and a near-distance image simultaneously captured through the imaging apparatus in FIG. 1 which includes the optical system shown in FIG. 4 or 5.

The imaging apparatus may further include a processor (e.g., a signal processor 14 in FIG. 1) that executes a process of joining images captured through the respective imaging devices of the second imaging systems having the first type parameters to form a first image (e.g., a far-distance image gf in FIG. 6) and joining images captured through the respective imaging devices of the second imaging systems having the second type parameters to form a second image (e.g., a near-distance image gn in FIG. 6).

Figure 7:
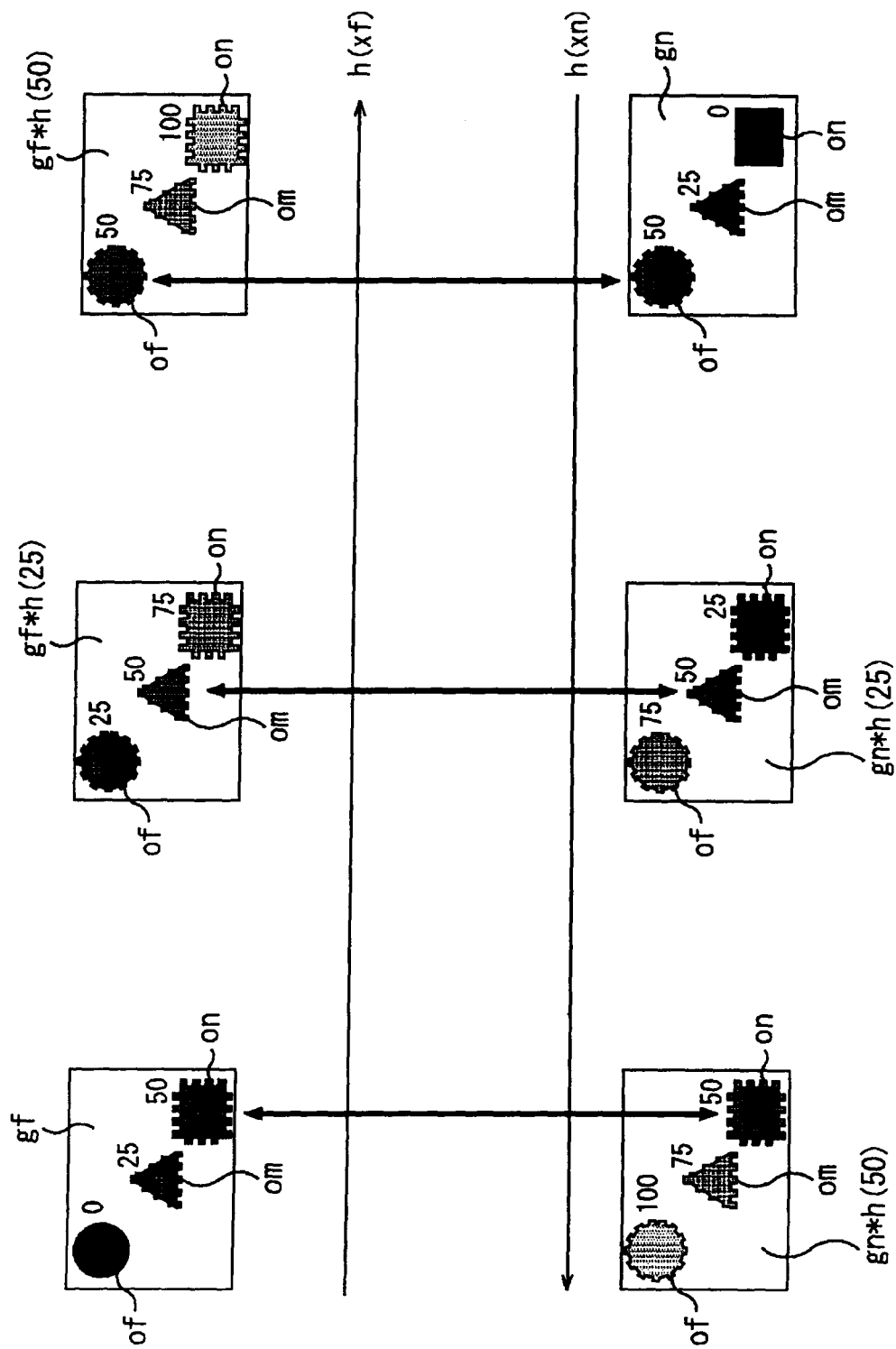
FIG. 7 is a diagram explaining an example of a method of measuring the distance between the imaging apparatus and a real object using the far-distance image and the near-distance image in FIG. 6.

The processor may further execute a process of measuring the distance between the imaging apparatus and a real-space domain (e.g., measuring the distance between the imaging apparatus and a middle-distance object "OM" in FIG. 6 corresponding a middle-distance object image "om" in middle part of FIG. 7) using the first and second images (for example, as shown in FIG. 7), the real-space domain corresponding to a predetermined part of each of the first and second images.

According to another embodiment of the present invention, there is provided a method for imaging with the imaging apparatus. According to further another embodiment of the present invention, there is provided a method for designing the imaging apparatus.

As described above, the present invention is applicable to an imaging apparatus, such as a digital still camera or a digital video camera, including a plurality of imaging devices, a method for imaging with the imaging apparatus, and a method for designing the imaging apparatus.

Embodiments of the present invention will now be described.

An imaging apparatus in accordance with an embodiment of the present invention has an optical system to which the following first and second techniques are applied.

According to the first technique, imaging is performed two times, that is, a first imaging system (hereinafter, referred to as a first optical system) and a second imaging system (hereinafter, referred to as a second optical system) are arranged. The first technique enables single-focus imaging while holding a blending area without causing physical interference among imaging devices (e.g., CCDs).

According to the second technique, at least one of the number of imaging devices, the position of each imaging device, and the zoom setting thereof in the second optical system arranged in accordance with the first technique. The second technique enables partial high-resolution imaging.

Furthermore, a prism is not required as a component of an imaging apparatus using the second technique (and the first technique). Thus, even when the number of imaging devices (CCDs) is increased, an increase in cost of the imaging apparatus can be suppressed.

FIG. 1 illustrates the structure of an imaging apparatus having an optical system to which the above-described first and second techniques are applied, i.e., in accordance with an embodiment of the present invention.

Referring to FIG. 1, the optical system of this imaging apparatus has a structure in which a first optical system 11 and a second optical system group 12 are arranged with a field lens 13 therebetween.

Figure 4:
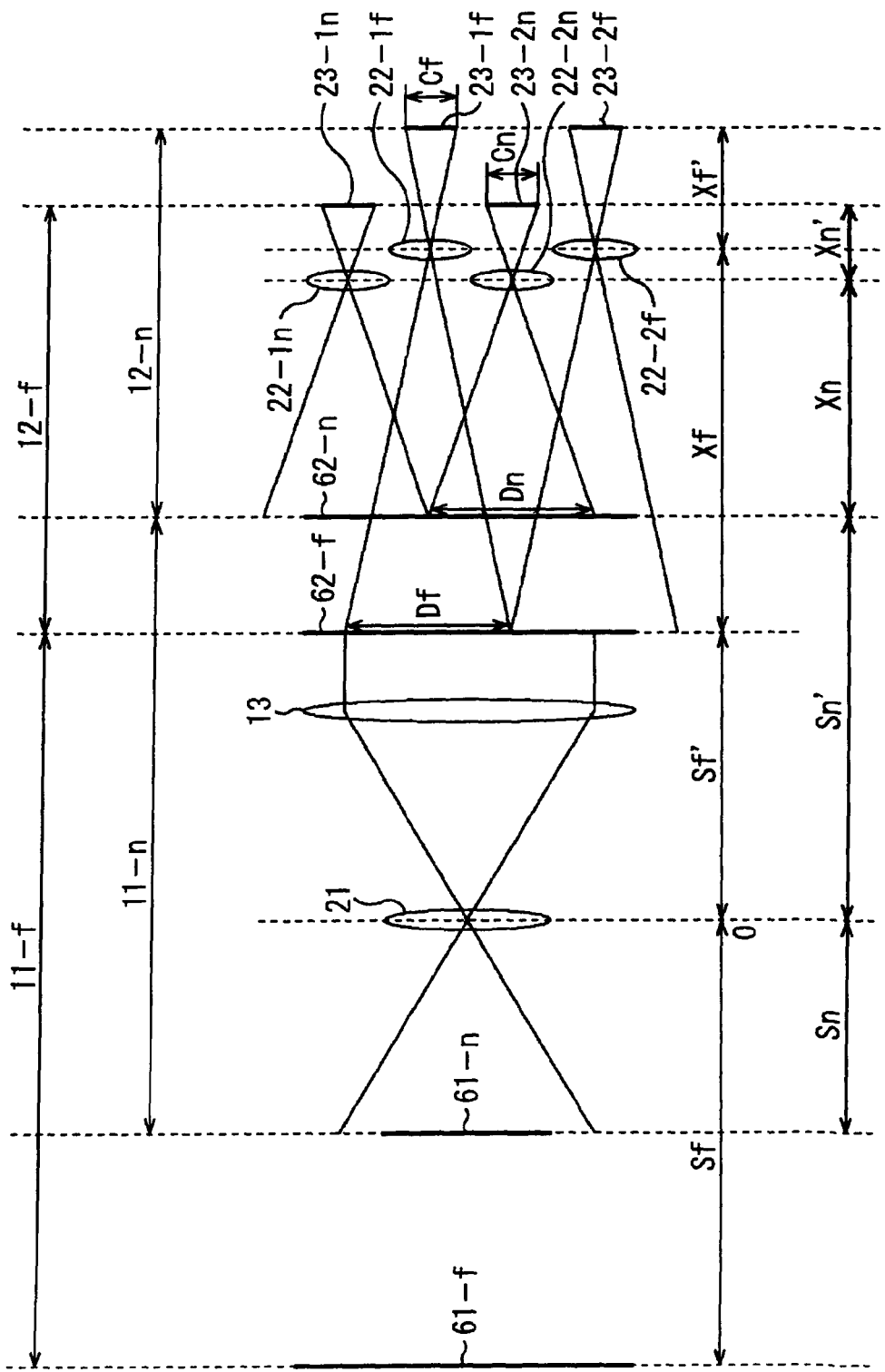
FIG. 4 is a diagram illustrating an example of the structure of an optical system mounted on the imaging apparatus of FIG. 1.
Figure 5:
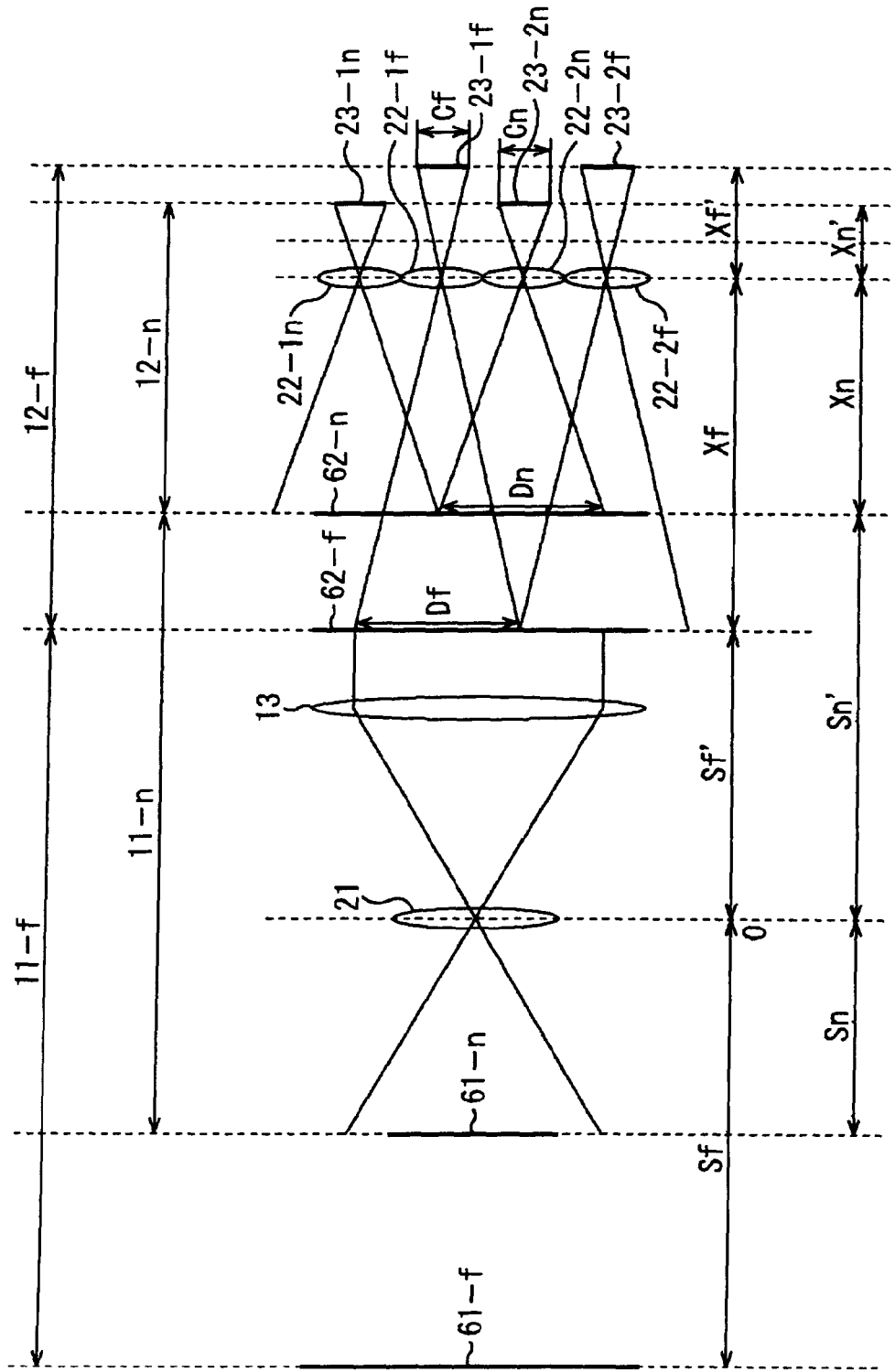
FIG. 5 is a diagram illustrating an example of the structure of another optical system mounted on the imaging apparatus of FIG. 1.

The first optical system 11 includes, for example, an objective 21 and defines optical characteristics, such as the angle of view, and once focuses an image of an object plane 2 (the plane 2 of an object) on or near the field lens 13. In other words, the field lens 13 is disposed at or near a focal point of the first optical system 11. A plane on which the first optical system 11 forms an image is referred to as a first imaging plane. First imaging planes 62-f and 62-n are shown in FIGS. 4 and 5, which will be described below.

The second optical system group 12 is composed of N (N is an integer of 2 or more) second optical systems each including one zoom lens 22-K and one CCD 23-K. K is an integer ranging from 1 to N. For the convenience of description, K corresponds to any of 1 to 3 in FIG. 1.

In this instance, each zoom lens 22-K includes not only one lens but also one or more lenses. The second optical system group 12 includes the zoom lenses 22-1 to 22-N each having the above-described structure. In other words, a certain second optical system in the second optical system group 12 includes predetermined any of the zoom lenses 22-1 to 22-N and the predetermined zoom lens includes one or more lenses.

In the above-described second optical system group 12, each CCD 23-K can be disposed without any interference with other CCDs. Thus, predetermined part of the image (the image of the object plane 2 in FIG. 1) on the first imaging plane can be formed on each CCD 23-K.

In FIG. 1, the field lens 13 is disposed. A diffuser (not shown) may be used instead of the field lens 13. The diffuser has a function of increasing the width of outgoing light, i.e., beam angle. Note that image resolution is reduced by this function.

In FIG. 1, each second optical system includes the CCD 23-K as the imaging device. The imaging device is not limited to the CCD. Any other imaging device can be used.

Referring to FIG. 1, each second optical system is smaller than the field lens 13. The structure is not limited to that in FIG. 1. For example, when each CCD 23-K is decentered, second optical systems each of which is larger than the field lens 13 may be used (arranged).

According to the present embodiment, a signal processor 14 appropriately executes various image processing operations on images captured through the respective CCDs 23-K, joins resultant images to form an image of the object plane 2 (e.g., images gf and gn in FIG. 6, which will be described later), and outputs the image.

According to the present embodiment, the signal processor 14 further executes an operation of shifting the position of each of the second optical systems constituting the second optical system group 12 and an operation of changing the zoom setting of each second optical system between a telephoto (TELE) end and a wide-angle (WIDE) end. Those operations are indicated by two arrows drawn from the signal processor 14 to the second optical system (a zoom lens 22-3 and a CCD 23-3).

Thus, the position and zoom setting of each second optical system can be easily changed independent of the other second optical systems. Accordingly, partial high-resolution imaging can be easily performed, leading to increased flexibility of imaging. Furthermore, the arrangement of the optical system can be changed to that shown in FIG. 4 or 5 during image capture, so that imaging can be readily performed with high accuracy in consideration of the distance between the imaging apparatus and an object. Thus, a far-distance image and a near-distance image can be simultaneously and separately captured with high quality and an object distance in the images can be measured with high accuracy.

Figure 2:
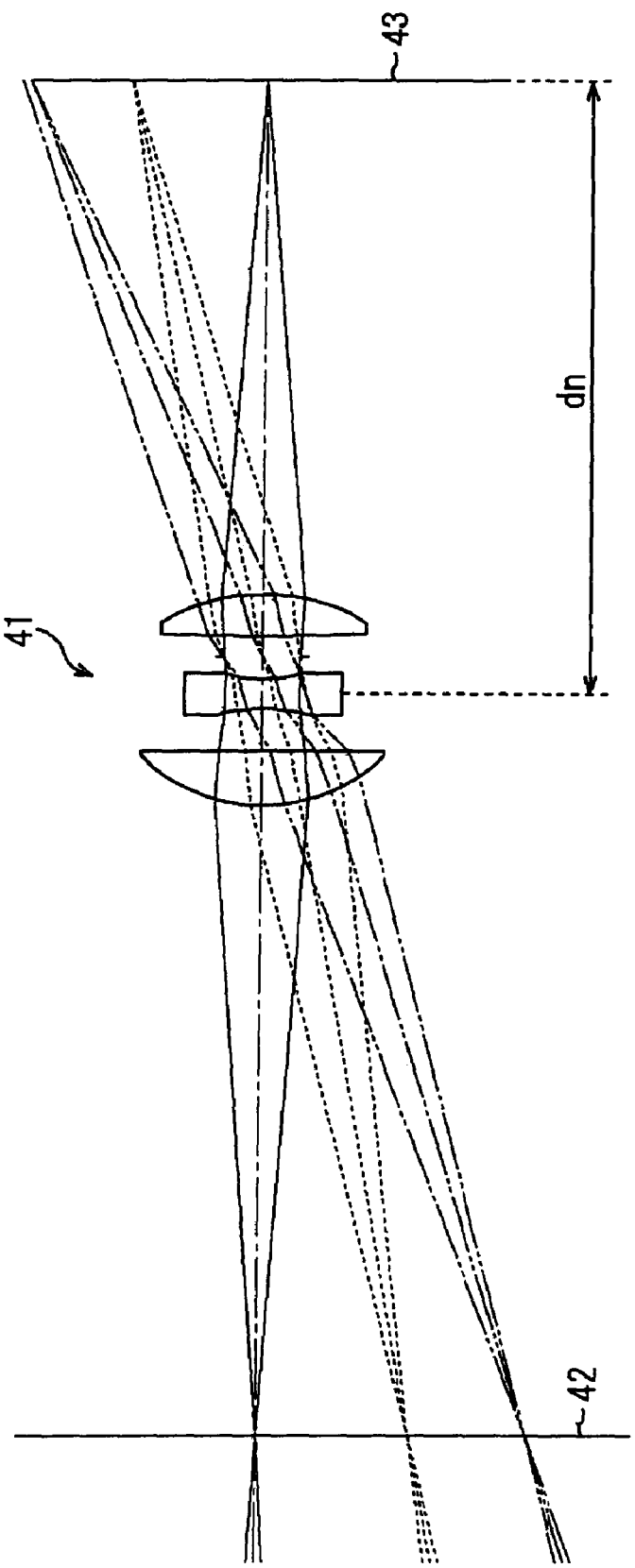
FIG. 2 is a diagram showing an example of the position of an imaging plane located when a short-distance object is imaged through lenses.

Further, the use of a signal processor in FIG. 2 of the drawings attached to the specification of the above-described Japanese Patent Application No. 2005-063675 instead of the signal processor 14 realizes the following third technique in addition to the above-described first and second techniques. According to the third technique, a process for phase correction or detection, a process for luminance correction or detection, and a process of automatically obtaining phase correction information or luminance correction information necessary for the foregoing process can be realized. The term "automatically" means that the imaging apparatus executes a process in accordance with its determination without any operation (excluding an input of a trigger signal) by a user using the imaging apparatus.

The distance between the imaging apparatus and an object (i.e., the object plane 2 in FIG. 1) will now be considered.

Figure 3:
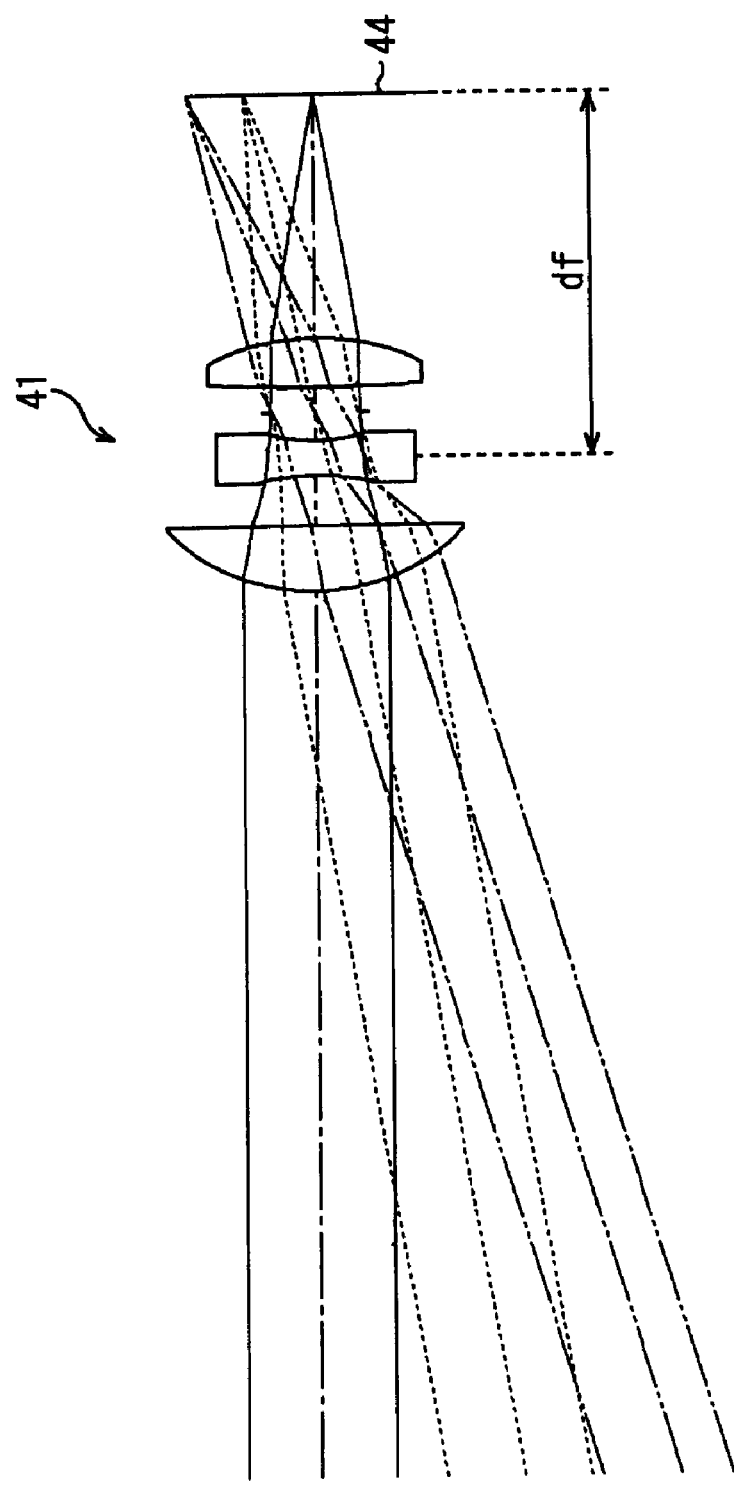
FIG. 3 is a diagram showing an example of the position of an imaging plane located when a long-distance object is imaged through the lenses.

Referring to FIG. 2, the position of an imaging plane 43 on which an image of a short-distance object 42, serving as an object captured through a lens group 41, is formed is represented using a length dn (hereinafter, referred to as a first length dn) between the center of the lens group 41 and the imaging plane 43. Referring to FIG. 3, the position of an imaging plane 44 on which an image of a long-distance object (not shown), serving as an object captured through the same lens group 41, is formed is represented using a length df (hereinafter, referred to as a second length df) between the center of the lens group 41 and the imaging plane 44.

When FIGS. 2 and 3 are compared, it is understood that the first length dn is longer than the second length df. As an object is closer to the imaging apparatus as described above (the distance between the imaging apparatus and the object is shorter), the distance between the lens group and the imaging plane is longer. Specifically, in the optical system in FIG. 1, as the distance between the object plane 2 and the objective 21 is shorter, the position of the first imaging plane (the imaging plane of the first optical system 11, i.e., the position of the imaging plane on the field lens 13) is farther away from the field lens 13.

As described above, when the distance between the imaging apparatus and an object (the object plane 2 in FIG. 1) changes, the position of the first imaging plane varies depending on the change. The present inventors, therefore, have considered that it is necessary to determine the position of the second optical system group 12 in accordance with the position of a target object (to be focused), i.e., the position of the first imaging plane corresponding to the object position.

The present inventors have invented the following new technique on the basis of the above-described consideration. According to the newly invented technique, various parameters, e.g., the position of each zoom lens 22-K in the second optical system group 12, the distance between the zoom lens 22-K and the corresponding CCD 23-K (i.e., an imaging plane of the second optical system), and the angle of view (the size of the CCD 23-K), are variable depending on the distance between the object plane 2 (object) and the imaging apparatus (the objective 21), i.e., the position of the first imaging plane that changes in accordance with a change in the distance between the object plane 2 and the imaging apparatus. In the following description, the newly invented technique will be called an object-distance based technique.

Further, the present inventors have invented a technique based on the object-distance based technique. According to this technique, the second optical system group 12 is composed of a subgroup (hereinafter, referred to as a far-distance subgroup 12-f) arranged in accordance with the parameters adapted to a case where the object plane 2 is far away from the imaging apparatus and another subgroup (hereinafter, referred to as a near-distance subgroup 12-n) arranged in accordance with the parameters adapted to a case where the object plane 2 is close to the imaging apparatus.

In the following description, each zoom lens 22-K and each CCD 23-K in the far-distance subgroup 12-f will be referred to as a zoom lens 22-Kf and a CCD 23-Kf, respectively. In addition, each zoom lens 22-K and each CCD 23-K in the near-distance subgroup 12-n will be referred to as a zoom lens 22-Kn and a CCD 23-Kn, respectively.

The realization of the above-described technique (based on the object-distance based technique) enables the capture of a focused image through each CCD 23-Kf in the far-distance subgroup 12-f, i.e., a far-distance image and the capture of a focused image through each CCD 23-Kn in the near-distance subgroup 12-n, i.e., a near-distance image. In other words, a far-distance image and a near-distance image can be simultaneously and separately captured by the above-described technique. In the following description, this technique will be called a simultaneous near and far distance imaging technique.

FIG. 4 shows an example of an optical system to which the simultaneous near and far distance imaging technique is applied. In other words, FIG. 4 illustrates an example of an optical system of an imaging apparatus according to an embodiment of the present invention.

In this instance, a method of determining (calculating) the above-described parameters in this optical system in FIG. 4 will now be described. The parameters include the position of each zoom lens 22-Kf in the far-distance subgroup 12-f, the distance (hereinafter, second optical distance) between each zoom lens 22-Kf and the corresponding CCD 23-Kf, and the angle of view (the size of the CCD 23-Kf), the position of each zoom lens 22-Kn in the near-distance subgroup 12-n, the distance (second optical distance) between each zoom lens 22-Kn and the corresponding CCD 23-Kn, and the angle of view (the size of the CCD 23-Kn).

A precondition for the calculation is the use of Gaussian imaging formula (equation for imaging at a finite distance) expressed by the following Expression (1) and Newton's imaging formula (equation for imaging at an infinite distance) expressed by the following Expression (2).

$$1/S' - 1/S = 1/f \quad (1)$$

where, S represents the distance between an object (to be imaged) and the center of a lens which receives light reflected from the object, S' represents the distance between the center of the lens and an image formed by the light passing through the lens, and f represents a front focal length.

$$Z*Z' = f*f' \quad (2)$$

where, f' represents a back focal length, Z represents the coordinate in the axial direction, whose origin is at f, of an object existing perpendicular to the optical axis of an optical system, and Z' represents the coordinate in the axial direction, whose origin is at f', of the corresponding formed image.

Other various parameters of the precondition for the calculation will be described as follows:

Let f denote the front focal length of the first optical system 11, let fn denote the front focal length of the near-distance subgroup 12-$n$, and let ff denote the front focal length of the far-distance subgroup 12-$f$.

Let Sf denote the distance between an object plane 61-$f$ at a long distance (hereinafter, referred to as a long-distance object plane 61-$f$) and the center of the objective 21, let Sf' denote the distance between the center of the objective 21 and a first imaging plane 62-$f$ (hereinafter, referred to as a far-distance first imaging plane 62-$f$) of the long-distance object plane 61-$f$, let Xf denote the distance between the far-distance first imaging plane 62-$f$ and the center of each zoom lens 22-Kf, and let Xf' denote the second optical distance (the distance between the center of each zoom lens 22-Kf and the corresponding CCD 23-Kf) in the far-distance subgroup 12-$f$.

Let Df denote the size of part of the far-distance first imaging plane 62-$f$ incident on each zoom lens 22-Kf, i.e., the horizontal length of the part corresponding to a predetermined side of the corresponding CCD 23-Kf, and let Cf denote the size (the length of the predetermined side) of the corresponding CCD 23-Kf. In other words, Cf represents a parameter indicating the angle of view in the far-distance subgroup 12-$f$.

In addition, let Sn denote the distance between an object plane 61-$n$ at a short distance (hereinafter, referred to as a short-distance object plane 61-$n$) and the center of the objective 21, let Sn' denote the distance between the center of the objective 21 and a first imaging plane 62-$n$ (hereinafter, referred to as a near-distance first imaging plane 62-$n$) of the short-distance object plane 61-$n$, let Xn denote the distance between the near-distance first imaging plane 62-$n$ and the center of each zoom lens 22-Kn, and let Xn' denote the second optical distance (the distance between the center of each zoom lens 22-Kn and the corresponding CCD 23-Kn) in the near-distance subgroup 12-$n$.

Let Dn denote the size of part of the near-distance first imaging plane 62-$n$ incident on each zoom lens 22-Kn, i.e., the horizontal length of the part corresponding to a predetermined side of the corresponding CCD 23-Kn, and let Cn denote the size (the length of the predetermined side) of the corresponding CCD 23-Kn. In other words, Cn represents a parameter indicating the angle of view in the near-distance subgroup 12-$n$.

On the precondition described above, the following Equations (3) to (8) are satisfied:

$$Sf'=1/(1/f-1/Sf)=Sf*f/(Sf-f) \quad (3)$$

$$Sn'=1/(1/f-1/Sn)=Sn*f/(Sn-f) \quad (4)$$

$$Xf'=1(1/ff-1/Xf)=Xf*ff/(Xf-ff) \quad (5)$$

$$Xn'=1(1/fn-1/Xn)=Xn*fn/(Xn-fn) \quad (6)$$

$$Xf'=Xf*Cf/Df \quad (7)$$

$$Xn'=Xn*Cn/Dn \quad (8)$$

For example, an imaging apparatus manufacturer may therefore determine respective parameters indicating the position of each zoom lens 22-Kf (represented by the distance Xf) in the far-distance subgroup 12-$f$, the second optical distance Xf', the angle of view Cf (i.e., the length Cf of one side of each CCD 23-Kf), the position of each zoom lens 22-Kn (represented by the distance Xn) in the near-distance subgroup 12-$n$, the second optical distance Xn', and the angle of view Cn (i.e., the length Cn of one side of each CCD 23-Kn) so as to satisfy the above-described Equations (3) to (8).

The manufacturer may construct the second optical systems in accordance with the determined parameters so as to provide the arrangement in FIG. 4.

As described above, the signal processor 14 can independently execute the operation of changing the position of each second optical system and the operation of changing the zoom setting thereof. Accordingly, the angles of view Cf and Cn may be predetermined (i.e., the CCDs 23-Kf with a predetermined size and the CCDs 23-Kn with a predetermined size may be mounted). The signal processor 14 may determine the position of each zoom lens 22-Kf (represented by the distance Xf) in the far-distance subgroup 12-$f$, the second optical distance Xf', the position of each zoom lens 22-Kn (represented by the distance Xn) in the near-distance subgroup 12-$n$, and the second optical distance Xn'. In this case, the signal processor 14 executes the operation of shifting the position of each second optical system and the operation of changing the zoom setting thereof in accordance with the parameters determined by the signal processor 14, so that the second optical systems can be arranged as shown in FIG. 4.

In consideration of the simplification of the structure of the total optical system, preferably, the same zoom lenses 22-K are used as lenses of the far-distance subgroup 12-$f$ and those of the near-distance subgroup 12-$n$ in the second optical system group 12, the positions of the zoom lenses 22-K (the positions thereof in the direction along the optical axis of the optical system) are aligned, and the sizes of the CCDs 23-K are uniformed. FIG. 5 illustrates an example of an optical system to which the simultaneous near and far distance imaging technique is applied. In other words, FIG. 5 shows a modification of the optical system of the imaging apparatus according to the embodiment of the present invention in FIG. 4.

In this case, a method for determining (calculating) the above-described parameters in the optical system of FIG. 5, e.g., the position of each zoom lens 22-Kf (represented by the distance Xf) in the far-distance subgroup 12-$f$, the second optical distance Xf', the angle of view Cf (length Cf of one side of each CCD 23-Kf), the position of each zoom lens 22-Kn (represented by the distance Xn) in the near-distance subgroup 12-$n$, the second optical distance Xn', and the angle of view Cn (length Cn of one side of each CCD 23-Kn), will now be described.

In the calculation, it is provided that the following Equations (9) to (12) are satisfied and each of the parameters Sf and Sn is set to a predetermined constant, in addition to the same precondition as that of the above-described case in FIG. 4.

$$Df=Dn \quad (9)$$

$$Cf=Cn \quad (10)$$

$$Xf+Sf'=Xn+Sn' \quad (11)$$

$$ff=fn \quad (12)$$

To construct the optical system in FIG. 5, for example, the manufacturer may determine the respective parameters, such as the position of each zoom lens 22-Kf (represented by the distance Xf) in the far-distance subgroup 12-$f$, the second optical distance Xf', the angle of view Cf (length Cf of one side of each CCD 23-Kf), the position of each zoom lens 22-Kn (represented by the distance Xn) in the near-distance subgroup 12-$n$, the second optical distance Xn' thereof, and the angle of view Cn (length Cn of one side of each CCD 23-Kn) so that the above-described Equations (3) to (12) are satisfied under the condition that each of the parameters Sf and Sn is the predetermined constant.

Specifically, the following Equations (13) to (16) are obtained under the conditions that each of the parameters Sf and Sn is the predetermined constant and the above-described Equations (3) to (12) are satisfied.

$$Xf+Sf'=Xn+Sn' \quad (13)$$

$$Xf'=Xf*ff/(Xf-ff) \quad (14)$$

$$Xn'=Xn*ff/(Xn-ff) \quad (15)$$

$$Xf'/Xf=Xn'/Xn \quad (16)$$

Further, the following quadratic equation (17) is derived from the above-described three Equations (14) to (16).

$$Xf^2+(Sf'+ff-Sn'1)*Xf+ff=0 \quad (17)$$

(Sf'+ff−Sn'−1) in Equation (17) is uniquely obtained because Sf, SS, and f are constants. In other words, (Sf'+ff−Sn'−1) is a constant.

For example, the manufacturer can therefore obtain Xf by solving Equation (17). The manufacturer can further obtain Xn by solving Equation (13) using Xf. After that, the manufacturer may determine the respective parameters, such as the position of each zoom lens 22-Kf (represented by the distance Xf) in the far-distance subgroup 12-f, the second optical distance Xf', the angle of view Cf (length Cf of one side of each CCD 23-Kf), the position of each zoom lens 22-Kn (represented by the distance Xn) in the near-distance subgroup 12-n, the second optical distance Xn', and the angle of view Cn (length Cn of one side of each CCD 23-Kn), using the obtained Xf and Xn and the above-described equations.

The manufacturer may construct the second optical systems on the basis of the determined parameters so as to provide the arrangement in FIG. 5.

In the case of FIG. 5, the angles of view Cf and Cn may be predetermined (i.e., the CCDs 23-Kf with a predetermined size and the CCDs 23-Kn with a predetermined size may be mounted) and the signal processor 14 may determine the position of each zoom lens 22-Kf (represented by the distance Xf) in the far-distance subgroup 12-f, the second optical distance Xf', the position of each zoom lens 22-Kn (represented by the distance Xn) in the near-distance subgroup 12-n, and the second optical distance Xn' in a manner similar to the case of FIG. 4. In this instance, the signal processor 14 executes the operation of shifting the position of each second optical system and the operation of changing the zoom setting thereof in accordance with the parameters determined by the signal processor 14, so that the respective second optical systems can be arranged as shown in FIG. 5.

The optical system, shown in FIG. 4 or 5, constructed in accordance with the parameters determined by the above-described calculation is mounted on the imaging apparatus and the imaging apparatus with the optical system is used for image capture. Consequently, a far-distance image and a near-distance image can be simultaneously and separately captured as described above. In other words, a far-distance image (in which a long-distance object is in focus) and a near-distance image (in which a short-distance object is in focus) of the same scene (the same domain in a real space) can be simultaneously captured.

Specifically, as shown in FIG. 6, it is assumed that real objects "OF", "OM", and "ON" exist in a real space that is divided into domains A to C, which will be described later with reference to FIG. 8 and the objects are away from the imaging apparatus (only the objective 21 thereof is shown in FIG. 6) in that order. In the following description, the real object "OF" will be called a long-distance object "OF", the real object "OM" will be called a middle-distance object "OM", and the real object "ON" will be called a short-distance object "ON".

In this case, predetermined part of an image on the far-distance first imaging plane 62-f, i.e., the predetermined part of a focused image of the long-distance object "OF" is imaged on each CCD 23-Kf in the far-distance subgroup 12-f. Images (images of the respective parts) captured through the respective CCDs 23-Kf in the far-distance subgroup 12-f are supplied to the signal processor 14 (see FIG. 1). The signal processor 14 executes the image processing operation on the images of the respective parts, i.e., joins the reimaged parts of the focused image of the long-distance object "OF", thus forming an image gf (hereinafter, referred to as a far-distance image gf) shown in FIG. 6.

The far-distance image gf includes an object image "of" (hereinafter, referred to as a long-distance object image "of") of the long-distance object "OF", an object image "om" (hereinafter, referred to as a middle-distance object image "om") of the middle-distance object "OM", and an object image "on" (hereinafter, referred to as a short-distance object image "on") of the short-distance object "ON". Since the long-distance object "OF" is in focus in the far-distance image gf, only the long-distance object image "of" corresponding to the long-distance object "OF" is not blurred in the far-distance image gf. Each of the middle-distance object image "om" and the short-distance object image "on" is blurred in accordance with the degree of blur depending on the distance between the corresponding real object and the imaging apparatus.

In the present embodiment, the degree of blur is represented by a value ranging from 0 to 100. The higher the value is, the larger the degree of blur is. In FIGS. 6 and 7, the degree of blur defined as described above is shown in the vicinity (principally, upper right) of each of the long-distance object image "of", the middle-distance object image "om", and the short-distance object image "on".

An image gn shown in FIG. 6 is also captured simultaneously with the far-distance image gf. Specifically, predetermined part of an image on the near-distance first imaging plane 62-n, i.e., predetermined part of a focused image of the short-distance object "ON" is imaged on each CCD 23-Kn in the near-distance subgroup 12-n. Images (images of the respective parts) captured through the respective CCDs 23-Kn in the near-distance subgroup 12-n are supplied to the signal processor 14. The signal processor 14 executes the image processing operation on the images of the respective parts, i.e., joins the reimaged parts of the focused image of the short-distance object "ON", thus forming the image gn (hereinafter, referred to as a near-distance image gn) shown in FIG. 6.

The present inventors have further invented a method for measuring the distance between the imaging apparatus and a predetermined position in the real space, e.g., the distance between the imaging apparatus and the long-distance object "OF" (hereinafter, simply referred to as the distance from the long-distance object "OF"), the distance between the imaging apparatus and the middle-distance object "OM" (hereinbelow, simply referred to as the distance from the middle-distance object "OM"), or the distance between the imaging apparatus and the short-distance object "ON" (hereinafter, simply referred to as the distance from the short-distance object "ON"), using the above-described far-distance image gf and near-distance image gn.

The measuring method will now be described. In the following description, it is assumed that the measuring method is applied to the imaging apparatus having the above-described optical system in FIG. 4 or 5, that is, the signal processor 14 (see FIG. 1) executes a process according to the measuring method.

The present method uses a blur function h(x) where the degree of blur x is a parameter (ranging from 0 to 100 in this case). According to the present embodiment, Gaussian function is used as the blur function h(x).

In this case, it is preferred that the blur function h(x) satisfy or approximately satisfy the following Equation (18). Strictly speaking, Gaussian function does not satisfy Equation (18). In the following description, it is assumed that the function approximately satisfies Equation (18).

$$h(x1+x2)=h(x1)*h(x2) \qquad (18)$$

The blur function h(x) is not limited to Gaussian function. Another function may be used.

The signal processor 14 substitutes a proper parameter xf into the blur function h(x) to obtain an output value h(xf) (hereinafter, referred to as a blur function output value h(xf)) and also substitutes a proper parameter xn into the blur function h(x) to obtain an output value h(xn) (hereinbelow, referred to as a blur function output value h(xn)). After that, the signal processor 14 multiplies the far-distance image gf by the blur function output value h(xf) and multiplies the near-distance image gn by the blur function output value h(xn), thus obtaining characteristics of the respective images. Consequently, the signal processor 14 can measure the distance from the long-distance object "OF", the middle-distance object "OM", or the short-distance object "ON" on the basis of the obtained characteristics of the images and characteristics of the respective blur function output values h(xf) and h(xn) used in the multiplication.

The far-distance image gf multiplied by the blur function output value h(xf) will be called a blurred far-distance image gf*h(xf) and the near-distance image gn multiplied by the blur function output value h(xn) will be called a blurred near-distance image gn*h(xn).

In other words, the signal processor 14 can measure the distance from the long-distance object "OF", the middle-distance object "OM", or the short-distance object "ON" on the basis of the respective characteristics of the blurred far-distance image gf*h(xf), the corresponding blur function output value h(xf), the blurred near-distance image gn*h(xn), and the corresponding blur function output value h(xn).

Specifically, when the signal processor 14 multiplies the far-distance image gf and the near-distance image gn by the proper blur function output values h(xf) and h(xn), respectively, the degree of blur of an area in the resultant blurred far-distance image gf*h(xf) matches that of the corresponding area in the resultant blurred near-distance image gn*h(xn). Hereinafter, the areas will be called blur matching areas.

The signal processor 14 evaluates the degree of matching between areas (corresponding to each other) in the blurred far-distance image gf*h(xf) and the blurred near-distance image gn*h(xn) using a method, such as least squares or correlation, and determines the highest evaluated areas, i.e., the areas having the highest degree of matching as the blur matching areas. Thus, the signal processor 14 can obtain the distance between the imaging apparatus and a real-space domain corresponding to the blur matching areas (e.g., real objects corresponding to images included in the blur matching areas) by proper calculation using the associated blur function output values h(xf) and h(xn).

Specifically, referring to left part of FIG. 7, the degree of blur of the short-distance object image "on" in the far-distance image gf (a blurred far-distance image gf*h(0) obtained by multiplying the far-distance image gf by a blur function output value h(0)=1) matches that of the short-distance object image "on" in a blurred near-distance image gn*h(50) obtained by multiplying the near-distance image gn by a blur function output value h(50). In other words, each area including the short-distance object image "on" is the blur matching area. The signal processor 14 can therefore obtain the distance from the short-distance object "ON" (see FIG. 6) corresponding to the short-distance object image "on" by proper calculation using the blur function output values h(0) and h(50).

Referring to middle part of FIG. 7, similarly, the degree of blur of the middle-distance object image "om" in a blurred far-distance image gf*h(25), obtained by multiplying the far-distance image gf by a blur function output value h(25), matches that of the middle-distance object image "om" in a blurred near-distance image gn*h(25) obtained by multiplying the near-distance image gn by a blur function output value h(25). In other words, each area including the middle-distance object image "om" is the blur matching area. The signal processor 14 can therefore obtain the distance from the middle-distance object "OM" (see FIG. 6) corresponding to the middle-distance object image "om" by proper calculation using the blur function output values h(25) and h(25).

Referring to right part of FIG. 7, similarly, the degree of blur of the long-distance object image "of" in a blurred far-distance image gf*h(50), obtained by multiplying the far-distance image gf by a blur function output value h(50), matches that of the long-distance object image "of" in the near-distance image gn (a blurred near-distance image gn*h(0) obtained by multiplying the near-distance image gn by a blur function output value h(0)=1). In other words, each area including the long-distance object image "of" is the blur matching area. The signal processor 14 can therefore obtain the distance from the long-distance object "OF" (see FIG. 6) corresponding to the long-distance object image "of" by proper calculation using the blur function output values h(50) and h(0).

The example of the method for measuring the distance from the long-distance object "OF", the middle-distance object "OM", or the short-distance object "ON" using the far-distance image gf and the near-distance image gn has been described. Another example of the method will now be described.

This method is reported by KUBOTA akira and AIZAWA kiyoharu (Graduate School of Frontier Sciences of The University of Tokyo), "Shouten Boke Fuyoniyoru Okuyuki Ryoiki no Kenshutsu-ho no Kento [Study on Method for Detecting Depth of Field by Defocusing]", Eizo Media Symposium [Image Media Processing Symposium] 2000 (IMPS2000).

Specifically, an image $f^{(h(xn),h(xf))}$ obtained from the blurred near-distance image gn*h(xn) and the blurred far-distance image gf*h(xf) is defined as expressed by the following Equation (19).

$$f^{(h(xn),h(xf))}=gn*h(xn)+gf*h(xf) \qquad (19)$$

Initially, the signal processor 14 generates images $f^{(0,0)}$, $f^{(0,\alpha)}$, and $f^{(\alpha,0)}$.

Subsequently, the signal processor 14 divides each of the images $f^{(0,0)}$, $f^{(0,\alpha)}$, and $f^{(\alpha,0)}$ into proper-sized blocks (e.g., 8×8 blocks) and then performs Fourier transform on each block.

Fourier transform on the (i, j)th block in each of the images $f^{(0,0)}$, $f^{(0,\alpha)}$, and $f^{(\alpha,0)}$ is expressed by the following Expressions (20) to (22).

$$S_{i,j}^{(0,0)}(\xi,\eta) \qquad (20)$$

$$S_{i,j}^{(0,\alpha)}(\xi,\eta) \quad (21)$$

$$S_{i,j}^{(\alpha,0)}(\xi,\eta) \quad (22)$$

The signal processor 14 then calculates criteria expressed by the following Equations (23) and (24) every block.

$$V_{i,j}^{(0,\alpha)} = \frac{1}{N_P} \sum_{(\xi,\eta)\in P} \frac{S_{i,j}^{(0,\alpha)}(\xi,\eta)}{S_{i,j}^{(0,0)}(\xi,\eta)} \quad (23)$$

$$V_{i,j}^{(\alpha,0)} = \frac{1}{N_P} \sum_{(\xi,\eta)\in P} \frac{S_{i,j}^{(\alpha,0)}(\xi,\eta)}{S_{i,j}^{(0,0)}(\xi,\eta)} \quad (24)$$

After that, the signal processor 14 compares the solutions of Equations (23) and (24), i.e., the criteria with predetermined threshold values t1 and t2, respectively, every block and determines which condition shown in FIG. 8 agrees with the comparison. Regarding the distance from the imaging apparatus to a real-space domain (including a real object) corresponding to a predetermined block (image), the signal processor 14 selects a determination (distance) that is to the right of the condition which agrees with the predetermined block. Referring to FIG. 8, "A", "On", "B", "Of", and "C" in the determinations represent the corresponding real-space domains in FIG. 6. In other words, when the determination in FIG. 8 indicates "On", the signal processor 14 determines that the distance from the imaging apparatus to a real-space domain corresponding to the predetermined block corresponds to the domain "On" including the short-distance object "ON". In other words, the signal processor 14 determines that the real-space domain corresponding to the predetermined block is the domain "On" including the short-distance object "ON".

As described above, the optical system of FIG. 4 or 5 is constructed in consideration of the distance between the imaging apparatus and an object. Accordingly, the imaging apparatus having this optical system can simultaneously and separately capture a far-distance image and a near-distance image and measure an object distance in the images.

Furthermore, using the following technique based on the above-described simultaneous near and far distance imaging technique can simultaneously capture not only far-distance and near-distance images but also three or more images of the same scene (same space) in a real world. The three or more images are focused images of three or more real object planes (the planes of real objects located in three or more real-space domains at different distances from the imaging apparatus in the real world). According to this technique, three or more second optical systems are arranged in accordance with parameters determined so that three or more real object planes are focused, i.e., the second optical system group is divided into three or more second optical system subgroups.

The above series of processes can be executed by hardware or software.

In this case, as least part (e.g., the signal processor 14) of the imaging apparatus having the optical system in FIG. 4 or 5 can include a computer shown in, for example, FIG. 9.

Referring to FIG. 9, a central processing unit (CPU) 201 executes various processes in accordance with a program stored in a read only memory (ROM) 202 or a program loaded in a random access memory (RAM) 203 from a storage unit 208. The RAM 203 appropriately stores data necessary for execution of the various processes of the CPU 201.

The CPU 201, the ROM 202, and the RAM 203 are connected to each other via a bus 204. An input/output interface 205 is connected to the bus 204.

An input unit 206 including a keyboard and a mouse, an output unit 207 including a display, the storage unit 208 including a hard disk, and a communication unit 209 including a modem and a terminal adapter are connected to the input/output interface 205. The communication unit 209 controls communication with another device (not shown) through a network, such as the Internet.

A drive 210 is connected to the input/output interface 205 as necessary. A removable recording medium 211, such as a magnetic disk, an optical disk, a magneto-optical disk, or a semiconductor memory, is loaded into the drive 210 as appropriate. A computer program read from the medium is installed on the storage unit 208 as necessary.

When the above-described series of processes is executed by software, a program constituting the software is installed through a network or a recording medium into a computer incorporated in dedicated hardware or into a multi-purpose personal computer capable of executing various functions by installing various programs.

The recording medium includes not only the removable recording medium (package medium) 211, such as a magnetic disk (including a flexible disk), an optical disk (e.g., a compact disk-read only memory (CD-ROM) or a digital versatile disk (DVD)), a magneto-optical disk (including a Mini-Disc (MD)), or a semiconductor memory, in which the program has been recorded and which is distributed in order to provide the program to a user but also the ROM 202 and the hard disk included in the storage unit 208, in each of which the program has been recorded, which are incorporated into the apparatus in advance and are then delivered to the user.

In this specification, steps executing the above-described program may be performed in time series in the described order, or may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A single-focus imaging apparatus including an array of imaging devices, the apparatus comprising:
   an optical system including
   a first imaging system configured to produce a focused image;
   at least one imaging plane on which an image produced through the first imaging system is formed; and
   a second imaging system group including a first subgroup having a first array of second imaging systems and a second subgroup having a second array of second imaging systems, each second imaging system including an imaging device and a lens through which at least part of the image formed on the at least one imaging plane is formed on the imaging device; and
   a processor,
   wherein
   at least a position of the lens, a distance between the lens and the imaging device, and an angle of view are determined as parameters of each second imaging system of the first and second subgroup, and are independently adjusted for each subgroup based on a position of the imaging plane, the position of the imaging plane changing based on a distance between the imaging apparatus and an object, the processor is configured to join images output by second imaging systems having shared parameters, and the imaging devices of the first subgroup are spatially offset from the imaging devices of the second subgroup in a direction of the optical axis.

2. The apparatus according to claim 1, wherein each second imaging system of the first subgroup has first type parameters determined based on the position of the imaging plane when the distance between the imaging apparatus and the object is a first length; and each second imaging system of the second subgroup has second type parameters determined based on the position of the imaging plane when the distance between the imaging apparatus and the object is a second length shorter than the first length.

3. The apparatus according to claim 2, wherein:

the processor is configured to join images captured through the respective imaging devices of the second imaging systems having the first type parameters to form a first image, and to join images captured through the respective imaging devices of the second imaging systems having the second type parameters to form a second image.

4. The apparatus according to claim 3, wherein the processor measures the distance between the imaging apparatus and a real-space domain using the first and second images, the real-space domain corresponding to a predetermined part of each of the first and second images.

5. A method for imaging with an imaging apparatus, comprising:

producing, at a first imaging system, a focused image;

forming, on at least one imaging plane, an image produced through the first imaging system;

forming, at a second imaging system group including a first subgroup having a first array of second imaging systems and a second subgroup having a second array of second imaging systems, where each second imaging system includes an imaging device and a lens, at least part of the image formed on the at least one imaging plane on the imaging device of each second imaging system via the lens of each second imaging system; and capturing respective predetermined part images formed on each imaging device therethrough, wherein before capturing the predetermined part image, at least a position of the lens, a distance between the lens and the imaging device, and an angle of view are determined as parameters of each second imaging system of the first and second subgroup and are independently adjusted for each subgroup based on a position of the imaging plane, the position of the imaging plane changing based on a distance between the imaging apparatus and an object, and the imaging devices of the first subgroup are spatially offset from the imaging devices of the second subgroup in a direction of the optical axis.

6. A method for making an imaging apparatus including at least a first imaging system and a second imaging system group having a first subgroup and a second subgroup of second imaging systems each having a lens and an imaging device, comprising:

determining as parameters and independently adjusting, at each second imaging system of the first subgroup and second subgroup, at least a position of the lens, a distance between the lens and the imaging device, and an angle of view based on a position of a predetermined imaging plane, the position of the predetermined imaging plane changing based on a distance between the imaging apparatus and an object so that a focused image is formed on the predetermined imaging plane through the first imaging system and an image of a predetermined part of the image formed on the imaging plane is formed on the imaging device of each second imaging system of the first and second subgroup, wherein the imaging devices of the first subgroup are spatially offset from the imaging devices of the second subgroup in a direction of the optical axis.

* * * * *